Figure 5:
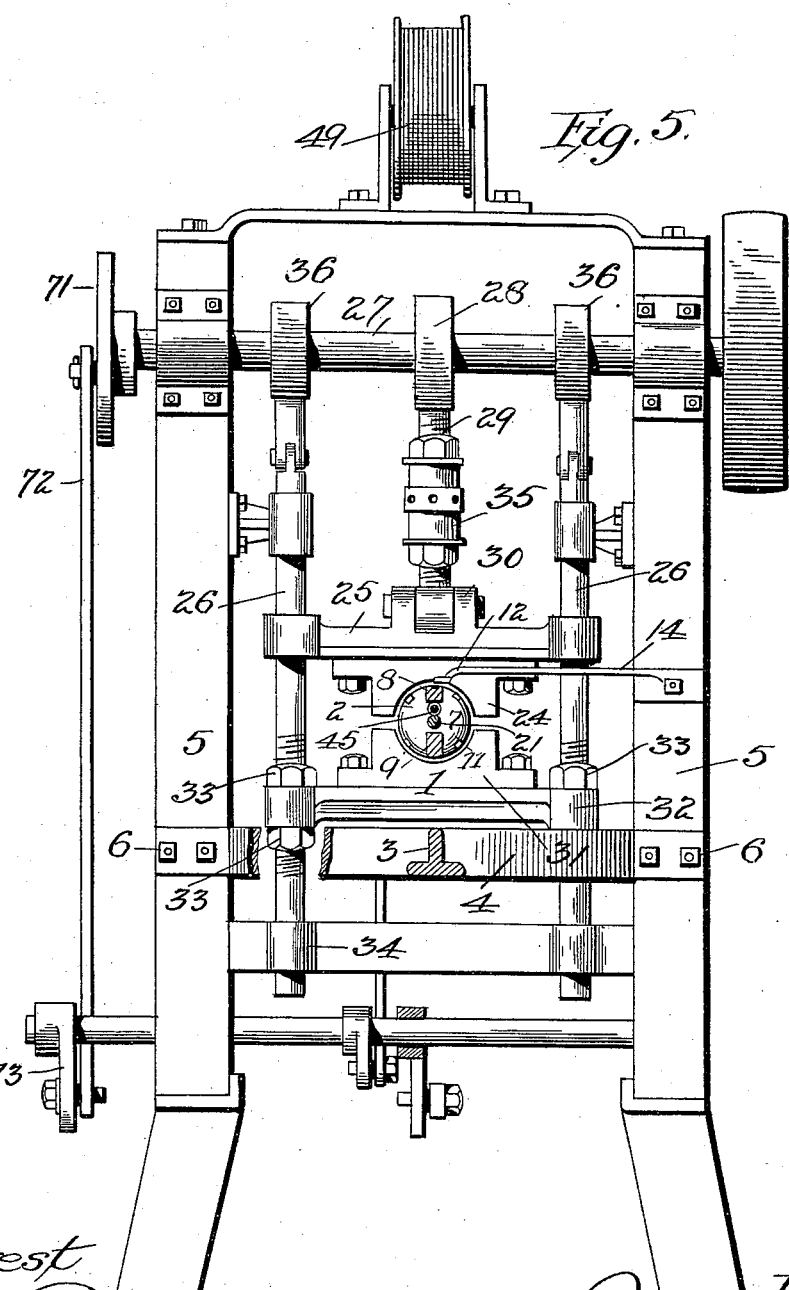

(No Model.)　　　　　　　　　　　　　　4 Sheets—Sheet 1.
J. SOLTER.
CAN MAKING MACHINE.
No. 577,457.　　　　　　　　Patented Feb. 23, 1897.
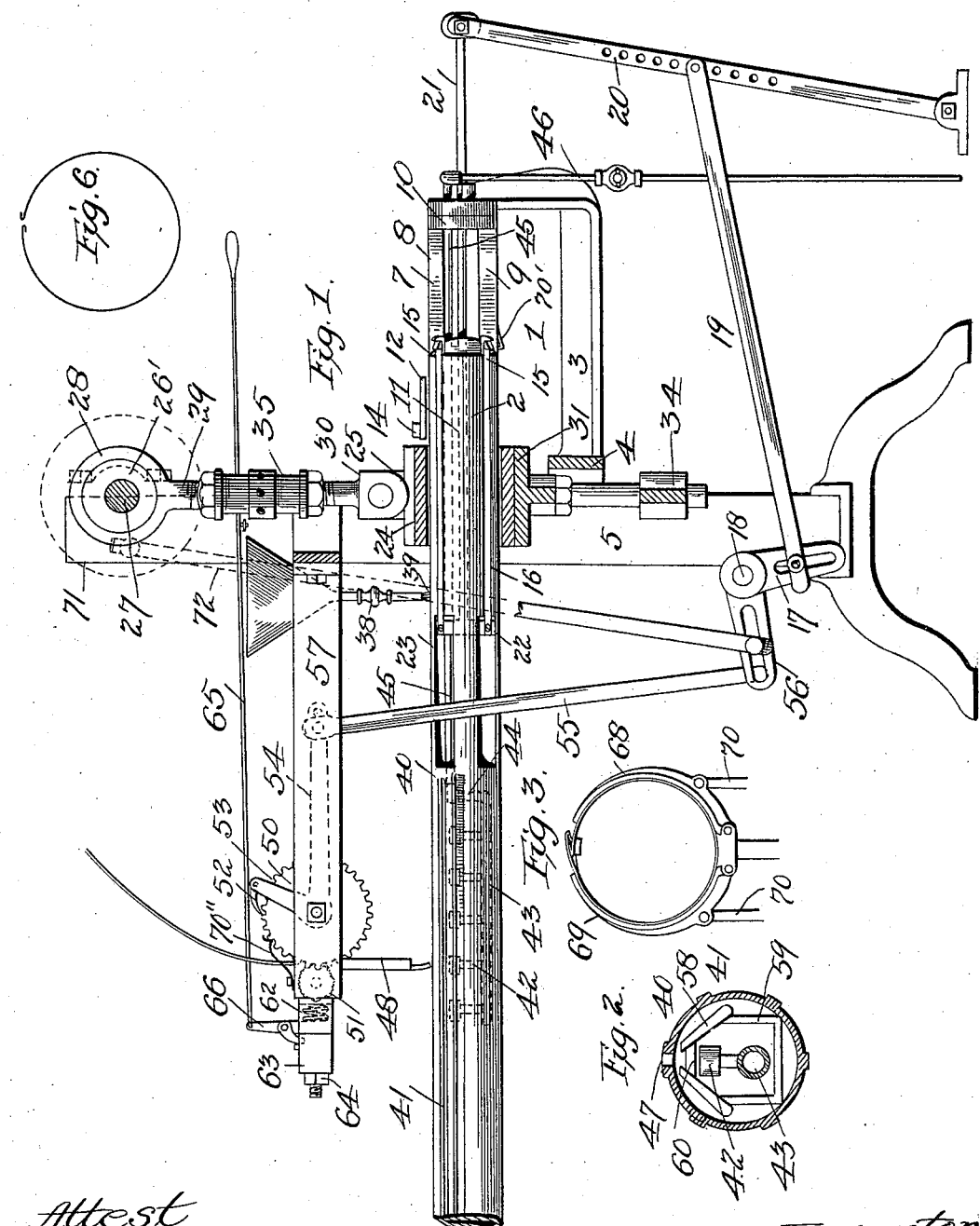

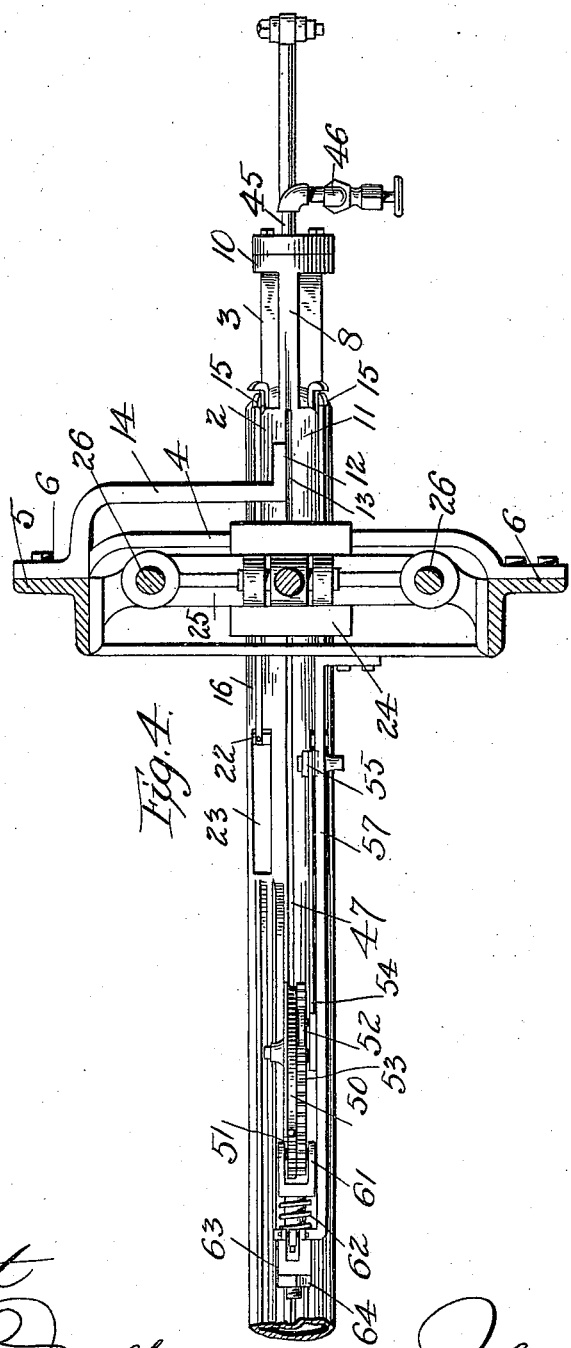

(No Model.) 4 Sheets—Sheet 3.

J. SOLTER.
CAN MAKING MACHINE.

No. 577,457. Patented Feb. 23, 1897.

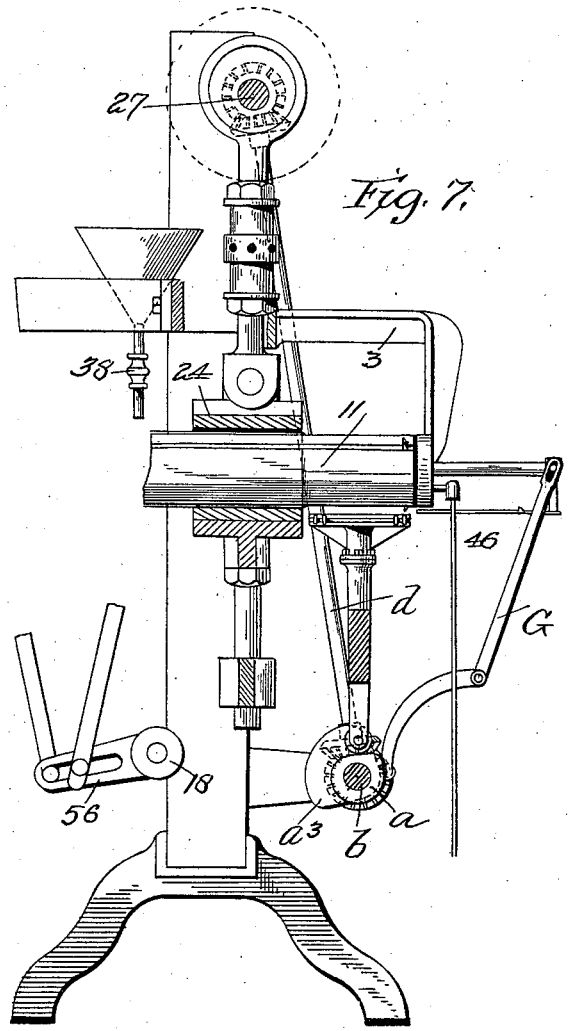

UNITED STATES PATENT OFFICE.

JOHN SOLTER, OF BALTIMORE, MARYLAND, ASSIGNOR OF ONE-HALF TO GEORGE L. KREBS, OF SAME PLACE.

CAN-MAKING MACHINE.

SPECIFICATION forming part of Letters Patent No. 577,457, dated February 23, 1897.

Application filed February 26, 1896. Serial No. 580,803. (No model.)

*To all whom it may concern:*

Be it known that I, JOHN SOLTER, a citizen of the United States, residing at Baltimore, in the State of Maryland, have invented certain new and useful Improvements in Can-Making Machines, of which the following is a specification, reference being had therein to the accompanying drawings.

It is the object of my invention to provide a machine for making can-bodies by forming the side seam and soldering the same during the passage of the body-blank through the machine.

I aim particularly to produce a machine of simple and economical construction, capable of carrying on the work with the greatest speed, the operator being required only to feed the blanks to one end of the mandrel, which are then moved past the seaming-die, the flux-bath, and the soldering mechanism in its passage along the mandrel to be discharged at the rear end of the mandrel a completed body.

My machine includes, essentially, a mandrel with means for moving the body-blanks along the same, said mandrel being combined with seaming-dies and soldering devices disposed at different points along its length, so that the blanks are brought successively to the seaming-die, the flux-bath, and the soldering devices, each can-body as it is placed on the mandrel abutting against and serving to move the body previously placed on the mandrel along the same.

In carrying out some of the details of my invention I employ devices heretofore shown and described by me in Letters Patent of the United States, notably that granted to me September 17, 1889, No. 411,071, which shows means for feeding the body along a mandrel similar to that now used by me, and the patent granted to me February 12, 1889, No. 397,758, which shows solder-feeding devices similar to that now used by me. Further, in my present machine I may employ automatic means for curling or bending a flat body-blank to a rounded body, such, for instance, as shown in said Patent No. 411,071, dated September 17, 1889.

In the drawings, Figure 1 is a side view of the mandrel and adjacent parts, parts being in section. Fig. 2 is a cross-sectional view of the mandrel. Fig. 3 shows means for bending the blanks automatically. Fig. 4 is a plan view of the machine with parts in section. Fig. 5 is a front view with parts in section. Fig. 6 is a detail view of the rolled blank from which the bodies are formed. Fig. 7 shows how the folders of Fig. 3 and of my previous patent above referred to are operated.

The blank for the can-body shown in Fig. 6 is preferably rolled to cylindrical form, as shown, with its edges bent back, so that when brought together they may interlock. The operator takes these blanks and, spreading them apart sufficiently, he passes them through the opening 1 between the mandrel 2 and its supporting-bracket 3, which is supported on a cross-plate 4, attached to the side frames 5 at 6. The mandrel is reduced at 7 and consists merely of two flat bars 8 9, extending forward and connected with the bracket 3 by the plate 10, bolted to the bracket. These bars are set one over the other in a vertical plane, and they are so narrow as to enable the operator to bring the separated edges of the blanks readily and quickly up along each side thereof, to be brought together above the upper bar and joined by being interlocked. The upper edge of the bar 8 is in line with the upper surface of the mandrel, and the operator, having interlocked the bent edges of the blank, pushes it rearward onto the solid cylindrical part 11 of the mandrel, and then he adjusts the interlocked seam against the gage 12, the edge of which lies on the mandrel and along one edge of the groove 13 in the top thereof. The gage is supported from the side frame by the arm 14. The blank is now in position to be engaged by the feed-slides 15, moving in grooves 16 of the mandrel and operated from an arm 17 on a rock-shaft 18 journaled in the frame by the link 19, the pivoted lever 20, the rod 21 extending from the lever at the front of the machine through the mandrel and its supporting-bracket to the cross-head 22, moving within the slotted part 23 of the mandrel, and connected to the feed-slides. These feed-slides and operating means are similar to those in my prior patent, No. 411,071. The first movement to the rear brings the can-body with its interlocked edges below the seaming-die 24, having a semicircular face to fit the mandrel's upper side and carried in a cross-head 25, moving on rods 26, and operated from an eccentric 26' on the main shaft 27 by the eccentric-strap 28 and rod 29, pivotally connected in ears 30 of the cross-head. As soon as the blank reaches its position the die descends and compresses the interlocked edges to form the seam, and in order to sustain the blow and prevent strain on the mandrel I use a lower thrust-block 31 on a cross-head 32, the ends of which are secured on the rods 26 between nuts 33, the lower ends of the rods working in guides 34. The cross-head carrying the thrust-block may be adjusted on the rods to take up the wear, and the rod 29 has an adjustable portion 35 to adjust the position of the upper die.

The rods 26 are operated by the eccentrics 36 on the shaft 27, and it will be seen from this that the thrust-block is raised simultaneously with the fall of the die to press the seam, and thus the strain is taken by the thrust-block and the shaft 27; and as this shaft also operates the die the whole strain of the operation comes thereon, this being a pushing strain at the center and a pulling strain at the outer ends, so the strains on the shaft are opposed and equalized. While the pressing of the seam is being done the operator is placing a fresh body-blank on the reduced front part of the mandrel by spreading the same, as before described, and the next feeding action of the feed-slides will move this blank from the front section 11 of the mandrel rearwardly under the seaming-die, and as this fresh blank abuts against the blank previously pressed this latter blank will be moved rearwardly, and thus the blanks will be moved along the mandrel, each fresh blank moving those previously pressed toward the rear or discharge end of the mandrel. The mandrel is elongated to contain a series of body-blanks at once. After leaving the seaming-die the can-body moving toward the rear passes by the fluxing device, consisting of a reservoir suitably supported on the frame and having a depending nozzle controlled by a valve 38, the lower end having a brush 39 in line with the seam. The mandrel is grooved lengthwise of its upper side to receive the seam, and in its rearward movement this groove guides the can-body, holding the seam in direct line with the fluxing device. After leaving the fluxing device the can-body moves over the hollow part 40 of the mandrel. This is grooved externally at 41 to provide less bearing-surface to the interior of the can, and within it a heating device is placed, consisting of a series of burners 42, extending up from a pipe 43, having an elbow 44 to connect with the pipe 45, extending forwardly through the mandrel between the bars of the reduced portion and out at the front of the supporting-bracket and connecting with the vertical pipe 46, leading to the gas-supply. The burner-tubes are directed upward to the narrow slit 47, forming a continuation of the guide-groove in the mandrel to receive the side seam. In its passage over this series of burners the seam is highly heated, as it is exposed to the direct action of the heat, and upon the application of solder to the seam the same is melted and spread to form a perfectly-soldered seam.

The soldering device is substantially the same as that shown in my prior patent, No. 397,758, dated February 12, 1889, before referred to, and consists of a solder-guiding tube 48, receiving the wire-solder from a reel 49 after having passed through between the feed-wheels 50 and 51, the former of which has a groove and is operated step by step from a pawl 52, engaging its toothed portion 53, said pawl being carried and operated by a bell-crank lever 54, which in turn is operated through the link 55 and slotted arm 56 from the rock-shaft before mentioned. A detent 70'' may be used to restrain the feed-wheels against undue movement.

The soldering device is supported by an arm 57 from the machine-frame above the rear extension of the mandrel, so that the solder-wire is directed downwardly upon the heated seam, and as the can-body moves to the rear over the burners the feed of the solder takes place, and the solder melting from the end of the wire is spread evenly along the seam. The can then passes to the rear and off at the discharge end, and this discharge end may be long enough to allow the can-body to become cooled before leaving the mandrel. It will be seen from this that the whole operation of forming the seam and soldering it is effected merely by passing the body-blanks along an elongated mandrel.

In order to direct the heat of the burners to the slit in the mandrel, deflecting-plates 58 are arranged in the mandrel, inclining from opposite sides over the burners, said plates being carried by a frame 59 and being connected at intervals by the cross-pieces 60.

The solder-feed wheel 51 is preferably carried in a movable fork 61, pressed forward by the spring 62, the shank of the fork passing through the guide-box 63. The feed may be stopped at any time by the operator without stopping the machine by simply retracting this fork against the spring-tension, and this retraction may be done by screwing up the nut 64 by hand or by pulling upon the rod 65, connected to the pivoted lever 66, the lower end of which engages a stud on the shank of the fork to retract the same.

The body-blanks fed to the machine as thus far described are in the form shown in Fig. 6, that is, they have been previously rolled to perfect cylindrical form. This makes the finished body a perfect cylinder and prevents the formation of any flat portions in the can sides. I may, however, feed the blanks to the machine in a flat state and provide means such as shown in Fig. 3 for folding the blank about a cylindrical mandrel and for interlocking the edges. This mechanism consists, as in my United States Patent No. 411,071, dated September 17, 1889, of pivoted folders 68 69, which may be operated from cams by rods 70, as in said patent, so that the ends of the blank are brought around into the position shown in Fig. 3, and upon the relaxing of the folder 68 previous to the release of the folder 69 the hooked part of the underlapping end of the blank will engage the hooked end of the overlapping end, so that these ends will interlock automatically ready for the seaming-die. This folding action takes place about a forward extension of the mandrel in front of the seaming-die, and this forward portion is slightly reduced to allow the ends of the blank to lap past each other. Fig. 7 illustrates the manner of applying this mechanism to the machine, $b$ being the cam-shaft, $a$ being the cam for operating the grip-bar, and $a^3$ the cam for operating the feed-slide, while G represents the feed-slide lever. These parts are the same as in the said patent, and cams such as $a'$ and $a''$ are used herein (but not shown) for operating the folding wings. The cam-shaft may be driven in any suitable manner, but I have shown, for convenience, an inclined shaft $d$ journaled in bearings on the main frame and having beveled gear connections with the shaft 27 and with the cam-shaft $b$.

In order to prevent retraction of the body-blank when the feed-slides return to normal position, a spring-detent 70' may be arranged in the lower part of the mandrel to lie when pressed in flush with the surface of the mandrel.

The rock-shaft for operating the feed-slides and the solder-feed device is operated from a crank-wheel 71 on the main shaft by a rod 72 and a slotted arm 73.

The mandrel is supported at its front end only, the rear being left entirely free for the movement rearward and discharge of the completed body, and the connection leading to the burner is also made through the front end.

In the form of machine using the folders the action of pressing the die, applying the flux, and soldering the seam is precisely the same as that described, the blanks being fed to the mandrel at its forward end and being fed along the same past the fluxing and soldering devices to be discharged at the rear.

I claim—

1. In combination, in a can-making machine adapted to be fed by hand, a die, a mandrel having an extension beyond the die with a reduced portion, said extension having a free space about it to permit the operator to fold the blank about the mandrel to interlock the seam and to properly adjust the blank, said extension having means by which the operator may accurately gage the position of the blank to aline the seam with the seaming-die, substantially as described.

2. In combination, the frame, the mandrel for the can-body, the reduced extension of said mandrel, a right-angular bracket connected with the front end of said reduced extension and extending to the frame with a space 1 between it and the mandrel for the proper simultaneous folding and interlocking of the body-blank about the reduced portion and a device arranged adjacent to the mandrel to act on the side seam, substantially as described.

3. In combination, a mandrel with means for moving the can-bodies along the same, a burner within the mandrel to act directly on the can-bodies and a soldering device acting on the outside of the mandrel and of the can, substantially as described.

4. In combination, a hollow mandrel, the burners arranged within the same, a wire-solder-feeding device arranged exterior and adjacent to the mandrel and burners and means for moving the can-bodies along the mandrel past the burners and soldering device, the said burners acting directly upon the can-bodies to heat the same and melt the solder substantially as described.

5. In combination, a mandrel having a substantially solid forward part and a hollow rear part, the seaming-die operating at the solid part, a burner within the hollow rear part acting directly on the can and the wire-solder-feeding device operating outside the hollow part of the mandrel, substantially as described.

6. In combination, a hollow mandrel having a slit, the burners within the mandrel directed to said slit to act directly on the can-body, the soldering device outside the mandrel also directed to the slit and means for moving the can-body along the mandrel with its seam covering said slit, substantially as described.

7. In combination, a mandrel having a grooved substantially solid front part, a seaming-die acting in conjunction therewith, a slitted hollow rear part the slit of which forms a continuation of said groove, a soldering device acting in conjunction therewith including the burners acting directly upon the can-bodies and means for moving the can-body along the mandrel, substantially as described.

8. In combination, a mandrel having a front part, a seaming-die, a hollow rear part, the soldering device and burner at the rear part, the intermediate slotted part of the mandrel, the cross-head moving inside the mandrel with the inner operating-rod and the feed-slide connected to the cross-head and moving in the face of the mandrel, substantially as described.

9. In combination, the mandrel having the reduced forward extension consisting of the upper and lower bars, the bracket with the space 1 between it and the bars to permit folding and interlocking of the body-blanks simultaneously about the reduced part of the mandrel, the seaming-die, the soldering device and the feed-slide having their operating-rod extending forward between the upper and lower bars and means for operating the rod, substantially as described.

10. In combination, the mandrel, the seaming-die, the cross-head carrying the same, the eccentric and rod for operating the cross-head, the thrust-block, the eccentrics and rods for operating the same, in opposition to the seaming-die and the shaft for operating the said connections, said seaming-die cross-head being guided on the rods of the thrust-block, substantially as described.

11. In combination, the elongated mandrel, the seaming-die, the shaft connected thereto for operating the same, the feed-slide, the rock-shaft having connections thereto for the same and solder-feeding mechanism connected with the rock-shaft to be operated thereby, substantially as described.

12. In combination, the means for holding the can-blank, and the soldering device comprising the feed-wheels between which the wire-solder is moved, and means for retracting one feed-wheel from the other to stop the feed, substantially as described.

13. In combination, the hollow mandrel, having a slit, the burners within the mandrel, the inclined deflectors to direct the flames to the slit and the soldering devices without the mandrel, substantially as described.

14. In combination, the upright frame, the mandrel projecting through the same to the front and to the rear, a bracket extending from the frame to support the front end of the mandrel, the rear end being free and unsupported, the seaming-die and thrust-block operating at the forward part of the mandrel, the burners within the rear of the mandrel and the wire-solder-feeding device on the outside of the mandrel, substantially as described.

In testimony whereof I affix my signature in presence of two witnesses.

JOHN SOLTER.

Witnesses:
HENRY E. COOPER,
WALTER DONALDSON.